3,450,786
PROCESS FOR POLYMERIZING NORMAL MONO-1-ALKENES
Thomas J. Clough, Glenwood, and David W. Young, Homewood, Ill., assignors to Sinclair Research, Inc., New York, N.Y., a corporation of Delaware
No Drawing. Continuation-in-part of applications Ser. No. 235,146, Nov. 2, 1962, Ser. No. 361,582, Apr. 21, 1964, and Ser. No. 447,046, Apr. 9, 1965. This application Aug. 23, 1966, Ser. No. 574,308
Int. Cl. C08f 15/04, 15/16, 1/72
U.S. Cl. 260—669                          15 Claims

ABSTRACT OF THE DISCLOSURE

Normal mono-1-alkenes of 5 to about 25, preferably about 12 to 20, carbon atoms are addition polymerized using a catalyst solution of about 2 to 7 wt. percent of aluminum chloride in ethyl chloride, a temperature of about 5 to 30° C., and a catalyst solution-to-monomer ratio sufficient to provide about 5 to 30% of aluminum chloride, based on the weight of monomers. In addition to homopolymerization, the process is suitable for effecting copolymerization of the mono-1-alkene with dissimilar, addition polymerizable, olefinically-unsaturated monomers such as butadiene-1,3; styrene; isoprene; and indene.

---

This application is a continuation-in-part of copending applications S.N. 447,046, filed Apr. 9, 1965, and S.N. 361,582, filed Apr. 21, 1964, which latter application is in turn a continuation-in-part of application S.N. 235,146, filed Nov. 2, 1962, all of which are now abandoned.

The present invention relates to a method of polymerizing normal mono-1-alkenes of 5 to about 25 carbon atoms, especially with one or more dissimilar ethylenically-unsaturated monomers. Relatively long-chain normal mono-1-alkenes, i.e., those having at least 5 carbon atoms, are generally characterized as possessing slow addition polymerization rates. Thus, in comparison with their lower molecular weight counterparts, as, for example, ethylene, propylene and isobutylene, the longer chain materials enter into polymerization reactions through their ethylenically unsaturated groups at significantly lower reaction rates. Contrastingly, ethylenically unsaturated monomers such as styrene, 1,3-butadiene, etc., form addition polymerization products quite readily and, in relation to longer-chain alpha-olefins, may be characterized as fast polymerizing monomers. Due to this disparity in polymerization rates, attempts to prepare copolymers of the longer-chain alpha-olefins with faster reacting monomers in any significant yields have been largely unsuccessful. Most often, attempts at copolymerization have proceeded to form a product consisting primarily of homopolymers of the fast polymerizing monomer and no significant yields of copolymers could be achieved.

By the polymerization method of the present invention normal alpha-olefins of 5 to about 25 carbon atoms will homopolymerize or react with one or more dissimilar olefinically-unsaturated polymerizable monomers, including fast-acting monomers, to form viscous copolymeric oils which are useful, for example, in forming detergent additives for mineral lubricating oils. The method of the invention involves the use of an aluminum trichloride catalyzed solution polymerization system wherein high catalyst-to-monomer ratios are employed in combination with relatively high reaction temperatures.

The normal mono-1-alkenes to be polymerized by the method of the present invention have 5 to about 25 carbon atoms, preferably about 12 to 20 carbon atoms. Often, a mixture of alpha-olefins derived from petroleum processing may be employed. Preferably, such mixtures are homologous and primarily span a range of about 4 to 8 carbon atoms. Demonstrative of such mixtures are the $C_{14}$–$C_{20}$ alpha-olefin mixture employed in Example I herein and the $C_6$–$C_{10}$ alpha-olefin mixture of Example II.

As noted, the method of the present invention may also be advantageously employed to copolymerize the normal alpha-olefin with another olefinically-unsaturated, copolymerizable monomer which is dissimilar to or different from the alpha-olefin. By dissimilar is meant falling outside the definition of the class of α-mono-alkenes described herein. The dissimilar monomer may have, say, about 3 to 26 carbon atoms and can generally be employed with the alpha-olefin hydrocarbon in amounts up to about 85%, preferably no more than about 50% of the total monomer on a molar basis. When the dissimilar monomer is present it frequently is at least about 5%, preferably at least about 15%, of the total monomer. As stated above, the polymerization method of the present invention is particularly useful for forming copolymers of the normal mono-1-alkene with dissimilar, olefinically-unsaturated monomers which may exhibit faster addition polymerization rates than the comparatively slow polymerizing alpha-olefins. Examples of such fast polymerizing monomers include, for instance, materials such as butadiene-1,3, isoprene, 2,3-dimethylbutadiene, alloocimene and other di- and tri- ethylenically unsaturated monomers, preferably aliphatic, of, say, about 4–10 carbon atoms; styrene, including substituted styrenes such as alpha-methylstyrene and para-chlorostyrene; indene; ethylenically unsaturated fatty acids, preferably of 8–20, or even 12–18, carbon atoms and lower alkyl esters thereof, etc. The dissimilar monomers, if employed, may be substituted with groups that do not adversely affect the reaction system to a significant extent.

Some ethylenically-unsaturated monomers have been found not to be "compolymerizable" with the normal mono-1-alkene polymerized by the method of the present invention and, accordingly are not suitable for use as the dissimilar monomer. Thus, for example, those materials such as vinyl chloride which degradatively affect the aluminum chloride catalyst, possibly, it is thought, through forming catalytically inert complexes therewith, are not copolymerizable.

The preferred ratio of alpha-olefin to dissimilar monomer in the reactant mixture may, of course, vary according to the particular dissimilar monomer employed, the properties sought in the final copolymer etc. Thus, where dienes or trienes are to be polymerized with the alpha-olefin it is often preferred, in order to ensure high copolymer yields, that the alpha-olefin be present in the reactant mixture in greater molar amounts than the polyene. Also, where certain fatty acid esters are employed as the dissimilar comonomer, as, e.g., methyl oleate, the maximum amount of unsaturated ester which can be incorporated in the copolymer product may be about 10 mol. percent. Furthermore, as stated above, the process of this invention is particularly suited for preparing copolymers which are useful in forming additives for lubricating oils; where such is the intended purpose it will be apparent that the dissimilar monomer should not be included in amounts which would render the polymer product insoluble in the base mineral oil. Thus, for example, in the case of styrene, amounts of this monomer greater than about 50 mol. percent when copolymerized with the alpha-olefin, may give resultant copolymers which do not exhibit adequate oil-solubility.

The catalyst employed in the polymerization is aluminum trichloride; other Friedel-Crafts catalysts have generally been found to be unsuitable, possibly due to their lower strength and, in some cases, to their lower solubility in the solvent employed in the present method. The catalyst is provided in solution in ethyl chloride, in which medium the alpha-olefin feed is likewise soluble, and the catalyst is essentially anhydrous. Whereas the prior art has often considered ethyl chloride and methyl chloride to be equally suitable as solvents for catalyst and reactants in Friedel-Crafts polymerization systems, it has now been found that the methyl halide is generally unsuited as a solvent medium in the polymerization method of the present invention, the solvent ability of the methyl chloride for the halide catalyst being insufficient to provide the high concentration of dissolved catalyst necessary in the present method. Ethyl chloride, moreover, by virtue of its higher boiling point, provides an efficient means, through solvent refluxing, of maintaining reaction temperatures within the preferred range, as will be more fully discussed hereinafter. Higher alkyl chlorides have been found to be generally unsuitable as solvents due to their poisoning effect on the catalyst.

The solution of $AlCl_3$ catalyst in ethyl chloride may contain at least about 2% and up to about 7%, by weight, of the catalyst, preferably about 4 to 6 weight percent. This catalyst solution can be supplied to the reaction zone in amounts sufficient to provide about 0.1 to 15 volumes of catalyst solution per volume of total monomer feed, preferably about 0.5 to 5 vol./vol. The strength of the catalyst solution and the volumetric ratio of that solution to monomer feed will be coordinated within the aforementioned ranges to provide about 5 to 30% of $AlCl_3$ catalyst by weight of the monomer fed. Preferably, there will be used about 10 to 25 weight percent of catalyst based on the weight amount of monomer fed. These catalyst percentages refer to the excess of catalyst over and above that portion, if any, which may chemically combine with the monomers and/or polymer product, as, for instance, which may occur where linoleic acid is present in the monomer feed, the free carboxyl group thereof being inclined to chemically combine with aluminum trichloride. The foregoing proportions represent a significantly higher ratio of catalyst to monomer than has been preferred in Friedel-Crafts polymerizations in the prior art. Thus, for example, whereas prior copolymerization reactions, for instance, the copolymerization of isobutylene with isoprene or butadiene, have most often been conducted using about one gram of Friedel-Crafts catalyst per 200 to 1000 grams of monomer fed, there is usually employed in the present invention at least about 10 and up to as much as about 100 times the weight amount of catalyst used in the prior art. Use of the smaller catalyst concentrations in an attempt to copolymerize the unmatched monomers of this invention would, once again, result in the production of substantially homopolymeric products.

In this invention, polymerization is carried out in the liquid phase, employing controlled introduction of the monomer feedstock and the catalyst solution into a reaction zone. The reaction temperature may range from about 5 to 30° C., preferably about 10 to 20° C., and condensing or refluxing means can be advantageously employed to keep some of the components in the liquid state at those temperatures. For example, Dry Ice traps may be used to reflux the ethyl chloride, which is above its boiling point at the preferred reaction temperatures. Polymerization temperatures employed in the method of the present invention are significantly higher than those usually employed in prior art Friedel-Crafts catalyzed polymerization methods, which, for example, have preferred to operate in the range of about −20 to −101° C. The use of higher temperatures in the present process, wherein long-chain alpha-olefins are reacted, results in the production of liquid polymerization products, whereas lower reaction temperatures provide solid products, once again primarily composed of homopolymers of the fast-acting monomers.

Ordinarily, atmospheric pressure is satisfactory for conducting the polymerization but super-atmospheric pressures, for example up to about 7 p.s.i.g. (the vapor pressure at room temperature of ethylchloride), or more may be employed if desired.

Introduction of the monomer feed and catalyst solution is conducted so as to establish and maintain in the reaction zone the above-described ratios of catalyst to monomer. The polymerization may be conducted batchwise, continuously, or in a semi-continuous manner. The different monomers may be added separately and simultaneously, or in admixture, or even sequentially, provided that the alpha-olefin is added first if the catalyst be present. It is often preferred, however, to add the monomers in admixture. The catalyst solution, however, should not be pre-admixed alone with any fast-acting monomer which may be present in the feed. A portion of the ethyl chloride, if desired, may be introduced with the monomer feed.

The invention will be better understood by reference to the following examples which are to be considered illustrative only and not limiting. All the examples fall within the broader concepts of this invention although the polymers and their method of preparation as set forth in Examples III–VII and X–XIV are described in copending applications of Thomas J. Clough.

The apparatus employed in Examples I through IX comprises a reaction vessel fitted with a stirrer, needle valves for the introduction of olefin and catalyst feeds and a Dry Ice trap. A graduated cylinder also provided with a Dry Ice trap is arranged to receive the ethyl chloride which evolves during the reaction.

In Examples X through XIV a continuous method of polymerization is employed, using a pressurized catalyst feed and a back-mix reactor. The olefin feed is first charged to a reservoir vessel and then pumped directly into the reactor at atmospheric pressure. Catalyst and solvent are charged to pressure vessels and stirred under a pressure of 100 p.s.i. of nitrogen for 45 minutes. The resulting catalyst solution is then pumped at 120 to 170 p.s.i. through a pressure reduction valve and into the back-mix reactor which is maintained at atmospheric pressure.

EXAMPLE I

To the catalyst reservoir was charged $AlCl_3$ and ethyl chloride to obtain a catalyst strength of 5.2 grams of aluminum chloride per 100 ml. of ethyl chloride. The catalyst intake valve was charged with this catalyst solution from the reservoir. To the olefin intake was charged an olefin feed consisting of 80% by weight of alpha-olefins of approximate composition: $C_{14}$ alpha-olefin, 5.0%; $C_{16}$ alpha-olefin, 31.1%; $C_{18}$ alpha-olefin, 63.1%; $C_{20}$ alpha-olefin, 0.8%; having an average molecular weight of 240.8 and a specific gravity of 0.782, and 20% by weight of styrene. The olefin feed and the catalyst solution were introduced into the reaction vessel simultaneously, the olefin feed at a rate of 24.5 ml./min., the catalyst solution at a rate of 50 ml./min. The total time for addition was 10 min. and the polymerization was continued for an additional 10 min. The temperature during the polymerization was 17.5° C. and 290 ml. of ethyl chloride was trapped out of the system during the polymerization.

Thus, the feedstock had a ratio of 1.75 moles of aliphatic alpha-olefin per mole of styrene and one mole of $AlCl_3$ catalyst was provided for each 3.42 moles of aliphatic alpha-olefin or each 5.36 moles total olefin fed. The overhead of ethyl chloride was 58% (290 ml.). After the aforementioned time, hexane (400 ml.) and isopropyl alcohol (400 ml.) were added to quench the catalyst. The copolymer was washed and stripped of solvents. Infrared confirmed the formation of a copolymer with no polystyrene present. The yield was 100% of a polymer having a kinematic viscosity at 210° F. of 41.03, an iodine number of 15.4 and a specific gravity of 0.8793.

EXAMPLE II

The catalyst intake was charged from the reservoir with a solution of aluminum chloride in ethyl chloride having a concentration of 2.6 grams $AlCl_3/100$ ml. ethyl chloride. The olefin intake was charged with an olefin feed consisting of 80.8% of alpha-olefins of the approximate composition: $C_6$ alpha-olefin, 1%; $C_7$ alpha-olefin, 29%; $C_8$ alpha-olefin, 47%; $C_9$ alpha-olefin, 22%; $C_{10}$ alpha-olefin, 1%. The olefins had an average molecular weight of 110 and a specific gravity of 0.724. The other 19.2% of the feed was styrene.

The olefin feed and catalyst solution were introduced simultaneously, the olefin at a rate of 19.7 ml./min., the catalyst solution at a rate of 40 ml./min. The total time for addition was 12 minutes and the polymerization was continued for an additional 13 minutes. The temperature during the polymerization was 21° C. and 385 ml. of ethyl chloride was trapped out of the system during the polymerization. The feed ratio was approximately 4.0 moles of aliphatic alpha-olefin per mole of styrene, and about one mole of $AlCl_3$ was used for each 13.8 moles of aliphatic alpha-olefin or 17.4 moles of total feed. The overhead of ethyl chloride was 80.5% (358 ml.).

After the end of the reaction period, the catalyst was quenched in isopropanol and washed and stripped of solvents. The yield based on olefin feed was 100%. Infrared confirmed the formation of a copolymer of styrene and $C_7$–$C_9$ alpha-olefin. No polystyrene was found to be present. The polymer had a kinematic viscosity at 100° F. of 1482.1 and at 210° F. of 66.60, an iodine number of 21.0 and a specific gravity of 0.8958.

EXAMPLE III

To a mixture of alpha-olefins of the following approximate composition:

| Component: | Wt. percent |
| --- | --- |
| Total olefins | 95+ |
| Total α-olefins | 94 |
| Straight chain α-olefins | 86 |
| Branched and naphthenic olefins | 3 |
| Straight chain, α,ω-diolefins | 6 |
| Saturated and aromatic hydrocarbons | 4 |

Molecular weight distribution

| No. of carbon atoms: | Wt. percent |
| --- | --- |
| 14 | 1 |
| 15 | 12 |
| 16 | 19 |
| 17 | 18 |
| 18 | 18 |
| 19 | 17 |
| 20 | 14 |
| 21 | 1 | was added isoprene and linoleic acid in a mole ratio of alpha-olefin to isoprene to linoleic acid of 6.65/2.45/1.0, based on the average molecular weight (243) of the alpha-olefin mixture. The olefin intake was charged with the olefin-linoleic acid-isoprene feed, and the catalyst intake was charged with a catalyst solution consisting of 5.2 grams of aluminum chloride per 100 ml. of ethyl chloride at 12° C.

Both the reactant feed and the catalyst solution were introduced into the reaction flask simultaneously, the olefin-linoleic acid-isoprene mixture at a rate of 24.2 ml. per minute (0.0615 mole per minute $C_{14}$–$C_{21}$ alpha-olefin, 0.026 mole per minute isoprene, 0.00923 mole per minute linoleic acid), the catalyst solution at a rate of 49 ml. per minute (0.0192 mole per minute aluminum chloride). The total time for the addition was 10 minutes and the polymerization mixture was stirred for an additional 20 minutes. The temperature during the polymerization was 16° C. and 320 ml. (61%) of ethyl chloride was trapped out of the polymerization system. Hexane, 400 ml., and 400 ml. of isopropanol were added to quench the catalyst.

The polymer was washed with dilute hydrochloric acid and washed three additional times with water. The polymer was stripped of solvents and had a KV at 100° F. of 3603 cs.; KV at 210° F. of 199.54 cs.; acid number of 25.44; iodine number of 43.9; and a specific gravity of 0.8778.

EXAMPLE IV

To a mixture of the alpha-olefin feed as in Example III was added 1,3-butadiene and methyl oleate in a mole ratio of methyl oleate to butadiene to alpha-olefin of 1 to 3 to 4, based on the average molecular weight of the alpha-olefin mixture. Into one charge vessel was added the alpha-olefin methyl oleate-butadiene feed, and to the other charge vessel was added a catalyst solution of 5.2 grams of aluminum chloride per 100 ml. of ethyl chloride at 12° C. Both the monomer feed and the catalyst solution were introduced into the reaction flask simultaneously, the monomer feed at a rate of 19.6 ml. per minute, the catalyst solution at a rate of 49.4 ml. per minute. The total time for addition was 12 minutes and the polymerization mixture was stirred for an additional 12 minutes. The temperature during polymerization was 15.5° C. and 340 ml. of ethyl chloride (57.5%) were trapped out of the system. The catalyst was quenched with 400 ml. hexane and 400 ml. of isopropanol. The polymer was washed with water and topped of solvents. The polymer had a saponification number of 38.0, specific gravity of 0.8897, iodine number of 32.0; KV at 100° F. of 1317.0 cs.

EXAMPLE V

To a mixture of the alpha-olefin feed as in Example III were added isoprene and methyl oleate to produce a mole ratio of alpha-olefin-isoprene-methyl oleate of 6.05 to 2.05 to 1.00, based on the average molecular weight of the alpha-olefin mixture. The olefin intake was charged with the reactant feed, and the catalyst intake was charged with a catalyst solution consisting of 5.2 grams of aluminum chloride per 100 ml. of ethyl chloride. Both the olefin feed and the catalyst solution were introduced into the reaction flask simultaneously, the olefin mixture at a rate of 20.8 ml. per minute (0.0525 mole per minute alpha-olefin, 0.0173 mole per minute isoprene, 0.00860 mole per minute methyl oleate), the catalyst solution at a rate of 39.5 ml. per minute (0.0154) mole per minute aluminum chloride). The total time for addition was 12 minutes and the polymerization was continued for an additional 28 minutes. The temperature during polymerization was 16° C. and 280 ml. (59%) of ethyl chloride was trapped out of the polymerization system. Hexane, 400 ml. and 400 ml. of isopropanol were added to quench the catalyst. The polymer was washed with water and, after topping of solvents, had the following properties: KV at 100° F. of 1190 cs.; KV at 210° F. of 94.54 cs.; iodine number, 30.7; saponification number, 24.3; specific gravity, 0.8780.

EXAMPLE VI

To a mixture of the alpha-olefin feed as in Example III was added linoleic acid in a mole ratio of alpha-olefin to linoleic acid of 5 to 1, based on the average molecular weight (243) of the alpha-olefin mixture. The olefin intake was charged with the olefin-linoleic acid feed, and the catalyst intake was charged with a catalyst solution consisting of 5.2 grams aluminum chloride per 100 ml. of ethyl chloride at 12° C.

Both the olefin-linoleic acid feed and the catalyst solution were introduced into the reaction flask simultaneously, the olefin-linoleic acid mixture at a rate of 22.0 ml. per minute (0.0590 mole per minute $C_{15}$–$C_{20}$ alpha-olefin, 0.0118 moles per minute linoleic acid), the catalyst solution at a rate of 60 ml. per minute (0.0234 mole per minute aluminum chloride). The total time for the addition of olefin-linoleic acid and catalyst solution was 8 minutes and the polymerization mixture was stirred for an additional 13 minutes. The temperature during the polymerization was 14° C. and 185 ml. of ethyl chloride was trapped out of the polymerization system. Hexane, 400 ml., and 400 ml. of isopropanol was added to quench the catalyst.

The polymer was washed with dilute hydrochloric acid and washed three additional times with water. The polymer was stripped of solvents and had a KV at 210° F. of 113.76 cs., acid number of 35.41 and an iodine number of 42.9.

EXAMPLE VII

To a mixture of the alpha-olefin feed as in Example III was added undecylenic acid in a mole ratio of alpha-olefin to undecylenic acid of 6 to 1, based on the average molecular weight of the alpha-olefin mixture. Into one charge vessel was added the olefin-undecylenic acid mixture and to the other charge vessel was added a catalyst solution of 5.2 grams of aluminum chloride per 100 ml. of ethyl chloride at 12° C. Both the olefin-acid feed and catalyst solution were introduced into the reaction flask simultaneously, the olefin-acid feed at a rate of 21.2 ml. per minute, the catalyst solution at a rate of 60 ml. per minute. The total time for addition was 12 minutes and the polymerization mixture was stirred for an additional 13 minutes. The temperature during polymerization was 14° C. and 220 ml. of ethyl chloride was trapped out of the system. The catalyst was quenched with isopropanol, and the polymer washed with dilute hydrochloric acid. The polymer was washed with water and topped of solvents. The polymer had an acid number of 30.68, specific gravity of 0.8771, iodine number of 45.5 KV at 100° F. of 4882.0 cs., and a KV at 210° F. at 229.86 cs.

EXAMPLE VIII 20 grams of indene and 80 grams of octadecene-1 were polymerized at 15° C. in the presence of 275 mls. of a saturated solution of aluminum chloride in ethyl chloride. In the run the catalyst solution and olefin were added to a 1-liter round bottomed Pyrex glass at the same time. The feed rate for the olefin was 18 mls./minute while the addition rate for the catalyst solution was 38 mls./minute. The polymerization was continued for an additional ten minutes after the additions of olefin and catalyst were completed and 222 ml. of ethyl chloride was trapped from the system during the reaction due to the heat of polymerization. Isopropyl alcohol, 250 ml., was added to quench the reaction and destroy the aluminum chloride activity, and then 250 ml. of hexane was added to dilute the system. The polymer in solution was stripped of solvent and washed with water. The dry polymer had a kinematic viscosity at 210° F. of 312 centistokes.

EXAMPLE IX

Homopolymers of the alpha-olefin mixture identified in Table I below were prepared according to the general procedure of Examples I–VIII:

Table I

| Component: | |
|---|---:|
| Total olefins, wt. percent | 99 |
| Total α-olefins, wt. percent | 92–95 |
| Straight chain α-olefins, wt. percent | 92–95 |
| Straight chain α, ω-diolefins, wt. percent | 0 |
| Saturated and aromatic hydrocarbons, wt. percent | 1 |
| Specific gravity (60/60° F.) | 0.779 |
| Iodine number | 104.9 |
| Peroxide content, meq./1. | 2.4 |
| Molecular weight distribution, wt. percent: | |
| No. of carbons— | |
| 14 | 5.0 |
| 16 | 31.1 |
| 18 | 63.1 |
| 20 | 0.8 |

The properties of the polymers produced and the specific polymerization conditions utilized are summarized in Table II below.

TABLE II.—POLYMERIZATION OF MIXED $C_{16}$–$C_{18}$ ALPHA-OLEFINS

| Run number | 1 | 2 | 3 | 4 | 5 | 6 | 7 | 8 | 9 | 10 | 11 | 12 [3] |
|---|---|---|---|---|---|---|---|---|---|---|---|---|
| Amount of olefin, ml. at 24° C | 150 | 170 | 100 | 120 | 70 | 150 | 235 | 150 | 200 | 200 | 200 | 200 |
| Rate of olefin addition, ml./min | 20 | 24 | 7 | 7 | 24 | 50 | 23 | 300 | 20 | 19 | 8 | 45 |
| Catalyst solution, ml | 184 | 100 | 150 | 135 | 170 | 160 | [1] 255 | 170 | 200 | 210 | 210 | 270 |
| Rate of catalyst solution addition, ml./min | 25 | 14 | 11 | 8 | 56 | 54 | 25 | 340 | 20 | 20 | 8 | 60 |
| Concentration of $AlCl_3$ in ethyl chloride, [2] g./100 ml | 5 | 5 | 5 | 5 | 5 | 5 | 5 | 5 | 0.9 | 4 | 5 | 5 |
| Temperature of polymerization, ° C | 12 | 40 | 15 | 15 | 10 | 12 | 12 | 12 | 12 | 12 | 12 | 12 |
| Ethyl chloride trapped, ml | 130 | 90 | 100 | 95 | | | | | 27 | 150 | | [4] 0 |
| Vol. percent ethyl chloride trapped | 70 | 90 | 67 | 71 | | | | | | | | |
| KV at 100° F., cs | 1,323 | 507 | 1,742 | 1,675 | 5,378 | 2,834 | 1,289 | 1,280 | | 313 | 1,998 | |
| KV at 210° F., cs | 118 | 51 | 152 | 174 | 362 | 258 | 109 | 83 | | 36 | 174 | 54 |
| Iodine number | 18 | 17 | 24 | 23 | | | 14 | | 111 | 29 | 18 | 17 |
| Bromine number | | | | | 6 | 9 | | 9 | | | | |
| Molecular weight (approx.) | 1,420 | | 1,080 | 1,110 | 2,750 | 1,880 | 1,840 | 1,840 | 230 | 900 | 1,400 | |

[1] Plus 100 ml. of ethyl chloride in reaction flask.
[2] Approximate values.
[3] Feed was 1-octadecene.
[4] Solvent was refluxed back into reactor.

The data of Table II show the improved results obtained in attempts to homopolymerize long-chain alpha-olefins by using the combination of high catalyst concentrations and relatively high reaction temperatures as prescribed by the present invention. Comparing, for example, Run 9 where a catalyst solution containing about 1 weight percent of $AlCl_3$ was employed with Runs 10 and 11 where catalyst concentrations of about 4.4 percent and 5.5 percent, respectively, were used, it is seen that the weakest catalyst solution failed to effect any polymerization whatsoever, while those runs using the progressively more concentrated solutions of the present invention yielded progressively higher molecular weight polymer products.

In Run 2 was employed a higher reaction temperature than preferred in the present invention (40° C.) and a lower ratio of catalyst to monomer than used in the present invention (about 3% of $AlCl_3$ by weight of monomer fed). There resulted some degree of polymerization but, as is evident from a comparison of the viscosities of the polymer products, far less than, for example, was obtained when reaction temperatures of 10° C. (Run 5) or 15° C. (Runs 3 and 4) were maintained and catalyst-to-monomer ratios of the present invention were used.

EXAMPLE X

To a mixture of the alpha-olefin feed as in Example III was added 1,3-butadiene and methyl oleate in a mole ratio of methyl oleate to butadiene to alpha-olefin of 1 to 6 to 8, based on the average molecular weight of the alpha-olefin mixture. The monomer mixture and catalyst solution (4.8 g. $AlCl_3$/100 cc. EtCl solution) were fed separately at a volumetric ratio of catalyst solution to monomer mixture of 3/1 into an empty back mix reactor, and the temperature maintained at 14–17° C. by distillation of ethyl chloride. Approximately 50 to 60 volume percent of input catalyst solution was distilled. Feeding was continued and, when a residence time of 40 minutes was attained, portions of the reactant mixture were removed from the reactor at a rate so adjusted that the reactant volume in the reactor remained constant. These portions were immediately quenched in water at 50–80° C. and wet ethyl chloride distilled from the quench tank and collected. Operation under these conditions was continued for a total of 4 residence times (160 minutes measured from the initial time) to allow the reactor to reach equilibrium. During the fifth residence time, the quench feed was switched to a new quench tank, and the nonequilibrium product in the first quench tank discarded. Simultaneous and continuous feeding of the reactor and collection of the product was continued until it was desired to cease operations. The product layer was separated from the aqueous layer, solvent washed and stripped to yield a clear, amber liquid having a saponification number of 18.4; specific gravity of 0.8776; iodine number of 23.4; KV at 100° F. of 3870 cs., and a KV at 210° F. of 243.9.

EXAMPLES XI–XIV

The terpolymers of these examples were prepared according to the procedure given in, and employing the reactants of, Example X; monomer ratios, catalyst ratio and residence times were varied as indicated in the following table:

TABLE III

| Example | Molar ratios | | | Catalyst solution/ monomer, vol. | Residence times, min. |
|---|---|---|---|---|---|
| | Methyl oleate | Alpha-olefin | Butadiene | | |
| XI | 1 | 4 | 3 | 3/1 | 20 |
| XII | 1 | 8 | 6 | 3/1 | 10 |
| XIII | 1 | 8 | 6 | 5/1 | 6 |
| XIV | 1 | 4 | 3 | 5/1 | 24 |

The resulting polymer products analyzed as follows:

TABLE IV

| Example | Sap. No. | Spec. grav. | Iod. No. | Kinematic viscosity, cs. | |
|---|---|---|---|---|---|
| | | | | 100° F. | 210° F. |
| XI | 38.2 | 0.8924 | 42.5 | 1,110 | 87.12 |
| XII | 15.8 | 0.8821 | 32.2 | 1,550 | 113.10 |
| XIII | 19.2 | 0.8735 | 37.8 | 2,449 | 175.06 |
| XIV | 23.7 | 0.8847 | 40.2 | 2,174 | 161.76 |

It is claimed:

1. A method for preparing normally-liquid polymers of about 100 to 15 mol percent of normal mono-1-alkene of about 12 to 20 carbon atoms and 0 to about 85 mol percent of dissimilar, olefinically-unsaturated, copolymerizable monomer of about 3 to 26 carbon atoms, which comprises feeding said alkene and said dissimilar monomer to a reaction zone maintained at a temperature of about 5 to 30° C. and feeding to the reaction zone a catalyst solution consisting essentially of about 2 to 7 weight percent of aluminum chloride in ethyl chloride, the rates of addition of alkene, dissimilar monomer and catalyst solution providing about 5 to 30 percent of aluminum chloride based on the total weight of alkene and dissimilar monomer fed.

2. The method of claim 1 wherein the catalyst solution is fed to the reaction zone separately from said dissimilar monomer.

3. The method of claim 1 wherein said dissimilar monomer comprises at least about 5 mole percent of the total alkene and dissimilar monomer fed.

4. The method of claim 1 wherein the reaction zone temperature is about 10 to 20° C.

5. The method of claim 1 wherein the rates of addition of alkene, dissimilar monomer and catalyst solution provide about 10 to 25 percent of aluminum-chloride based on the total weight of the alkene and dissimilar monomer fed.

6. The method of claim 1 wherein the catalyst solution consists essentially of about 4 to 6 weight percent of aluminum chloride in ethyl chloride.

7. The method of claim 3 wherein the dissimilar monomer is butadiene-1,3.

8. The method of claim 3 wherein the dissimilar monomer is styrene.

9. The method of claim 3 wherein the dissimilar monomer is isoprene.

10. The method of claim 3 wherein the dissimilar monomer is indene.

11. A method for preparing normally-liquid polymers of about 95 to 15 mol percent of normal mono-1-alkene of about 12 to 20 carbon atoms and about 5 to 85 mol percent of dissimilar, olefinically, unsaturated, copolymerizable monomer of about 3 to 26 carbon atoms, which comprises feeding said alkene and said dissimilar monomer to a reaction zone maintained at a temperature of about 10 to 20° C. and feeding to the reaction zone and separately from said dissimilar monomer a catalyst solution consisting essentially of about 4 to 6 weight percent of aluminum chloride in ethyl chloride, the rates of addition of alkene, dissimilar monomer and catalyst solution providing about 10 to 25 percent of aluminum chloride based on the total weight of alkene and dissimilar monomer fed.

12. The method of claim 11 wherein the dissimilar monomer is butadiene-1,3.

13. The method of claim 11 wherein the dissimilar monomer is styrene.

14. The method of claim 11 wherein the dissimilar monomer is isoprene.

15. The method of claim 11 wherein the dissimilar monomer is indene.

References Cited

UNITED STATES PATENTS

| | | |
|---|---|---|
| 2,474,881 | 7/1949 | Young et al. |
| 2,559,984 | 7/1951 | Montgomery et al. |
| 2,603,665 | 7/1952 | Young _____ 260—683.15 |
| 3,330,883 | 7/1967 | Giannetti et al. |

DELBERT E. GANTZ, *Primary Examiner.*

C. R. DAVIS, *Assistant Examiner.*

U.S. Cl. X.R.

260—683.15